United States Patent
Sasaki et al.

(10) Patent No.: US 11,011,743 B2
(45) Date of Patent: May 18, 2021

(54) LITHIUM ION SECONDARY BATTERY

(71) Applicant: Vehicle Energy Japan Inc., Hitachinaka (JP)

(72) Inventors: Hironori Sasaki, Tokyo (JP); Shuichi Suzuki, Tokyo (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 96 days.

(21) Appl. No.: 15/500,778

(22) PCT Filed: May 21, 2015

(86) PCT No.: PCT/JP2015/064603
§ 371 (c)(1),
(2) Date: Jan. 31, 2017

(87) PCT Pub. No.: WO2016/035396
PCT Pub. Date: Mar. 10, 2016

(65) Prior Publication Data
US 2017/0222218 A1 Aug. 3, 2017

(30) Foreign Application Priority Data
Sep. 1, 2014 (JP) .............................. JP2014-177372

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0435* (2013.01); *H01M 4/133* (2013.01);
(Continued)

(58) Field of Classification Search
None
See application file for complete search history.

(56) References Cited

U.S. PATENT DOCUMENTS

| 9,039,788 B2* | 5/2015 | Xu ...................... H01M 4/0471 |
| | | 29/623.1 |
| 2001/0014422 A1* | 8/2001 | Omaru .................. H01M 2/348 |
| | | 429/231.1 |

(Continued)

FOREIGN PATENT DOCUMENTS

| CN | 102903898 A | 1/2013 |
| JP | 7-192723 A | 7/1995 |

(Continued)

OTHER PUBLICATIONS

Japanese Office Action issued in corresponding application No. 2014-177372 dated Aug. 1, 2017.

(Continued)

*Primary Examiner* — Maria Laios
*Assistant Examiner* — Angela J Martin
(74) *Attorney, Agent, or Firm* — Foley & Lardner LLP

(57) ABSTRACT

An object of the present invention is to provide a lithium ion secondary battery enabling improvement of output characteristics at the time of charge and discharge at low temperature and at room temperature. A lithium ion secondary battery according to the present invention for achieving the above object includes a positive electrode plate (11) including a positive electrode mix layer, and a negative electrode plate (12) including a negative electrode mix layer (45). The negative electrode mix layer (45) contains a graphite-type material (42), metal oxide (44), and a conductive assistant (43). The conductive assistant (43) is a carbon material that does not dope or dedope lithium ions, and a mixing ratio of the conductive assistant (43) is 0.4 weight % or more and less than 1.2 weight % of weight of the negative electrode mix layer (45).

8 Claims, 3 Drawing Sheets

(51) Int. Cl.
  *H01M 4/50* (2010.01)
  *H01M 4/52* (2010.01)
  *H01M 4/58* (2010.01)
  *H01M 4/62* (2006.01)
  *H01M 10/05* (2010.01)
  *H01M 4/133* (2010.01)
  *H01M 4/505* (2010.01)
  *H01M 4/525* (2010.01)
  *H01M 4/587* (2010.01)
  *H01M 10/0525* (2010.01)
  *H01M 4/02* (2006.01)

(52) U.S. Cl.
  CPC ........... *H01M 4/505* (2013.01); *H01M 4/523* (2013.01); *H01M 4/525* (2013.01); *H01M 4/587* (2013.01); *H01M 4/623* (2013.01); *H01M 4/625* (2013.01); *H01M 10/0525* (2013.01); *H01M 2004/027* (2013.01)

(56) References Cited

U.S. PATENT DOCUMENTS

| | | | | |
|---|---|---|---|---|
| 2004/0101756 A1* | 5/2004 | Koyama | ............... | H01M 4/133 |
| | | | | 429/231.8 |
| 2004/0185330 A1* | 9/2004 | Yamaguchi | ......... | H01M 2/0275 |
| | | | | 429/59 |
| 2011/0256456 A1* | 10/2011 | Jeon | .................. | H01M 10/0565 |
| | | | | 429/303 |
| 2012/0028125 A1* | 2/2012 | Kobori | .................... | H01M 4/13 |
| | | | | 429/232 |
| 2012/0121991 A1* | 5/2012 | Tikhonov | .............. | H01M 4/131 |
| | | | | 429/338 |
| 2013/0288138 A1* | 10/2013 | Tikhonov | ................ | H01M 4/38 |
| | | | | 429/338 |
| 2015/0044567 A1* | 2/2015 | Tanjo | .................... | H01M 4/505 |
| | | | | 429/223 |
| 2015/0340693 A1* | 11/2015 | Imaji | .................... | H01M 4/587 |
| | | | | 252/182.1 |

FOREIGN PATENT DOCUMENTS

| | | | | | |
|---|---|---|---|---|---|
| JP | H07192723 | * | 7/1995 | ............ | H01M 10/05 |
| JP | 2004-171901 A | * | 6/2004 | .............. | H01M 4/02 |
| JP | 2004-171901 A | | 6/2004 | | |
| JP | 2005154805 | * | 6/2005 | .............. | C23C 18/06 |
| JP | 2013-235653 A | * | 11/2013 | .......... | H01M 10/052 |
| JP | 2013-235653 A | | 11/2013 | | |

OTHER PUBLICATIONS

Office Action issued in corresponding Chinese application No. CN201580042003.4 dated May 13, 2019.

* cited by examiner

LITHIUM ION SECONDARY BATTERY

TECHNICAL FIELD

The present invention relates to a lithium ion secondary battery.

BACKGROUND ART

A lithium ion secondary battery has already been in common use as a battery for a mobile phone, a notebook computer, and the like, and application thereof to a middle or large battery such as batteries for an automobile, power storage, and load leveling is progressing.

As an electrode for use in a conventional lithium ion secondary battery, PTL 1 discloses an electrode including a graphitic material, a non-graphitic material, and a mixed material of metal materials such as iron oxide, tin, tin oxide, and silicon oxide enabling lithium to be doped and dedoped for the purpose of achieving high discharge capacity and improving output characteristics at the time of charge and discharge at low temperature.

CITATION LIST

Patent Literature

PTL 1: JP 7-192723 A

SUMMARY OF INVENTION

Technical Problem

However, in the secondary battery using the aforementioned electrode, not only outputs at the time of charge and discharge at low temperature but also outputs at the time of charge and discharge at room temperature must be high.

In the technique in PTL 1, although improvement of output characteristics at the time of charge and discharge at low temperature is disclosed as described above, improvement of output characteristics at the time of charge and discharge at room temperature is not considered.

An object of the present invention is to provide a lithium ion secondary battery enabling improvement of output characteristics at the time of charge and discharge at low temperature and at room temperature.

Solution to Problem

As the result of concerted study directed towards solving the aforementioned problem, the present inventors arrived at the present invention, upon discovering that, by using a composite negative electrode material in which a graphite material is mixed with metal oxide and a carbon-based conductive assistant that does not dope or dedope lithium ions at a specified ratio, it is possible to obtain a lithium ion secondary battery restricting overvoltage at as low temperature as −30° C., improving output characteristics at room temperature, and having low resistance.

Specifically, the present invention is a lithium ion secondary battery including; a positive electrode plate including a positive electrode mix layer; and a negative electrode plate including a negative electrode mix layer, wherein the negative electrode mix layer contains a graphite-type material, metal oxide, and a conductive assistant, and wherein the conductive assistant is a carbon material that does not dope or dedope lithium ions, and a mixing ratio of the conductive assistant is 0.4 weight % or more and less than 1.2 weight % of weight of the negative electrode mix layer.

Advantageous Effects of Invention

According to the invention, output characteristics of a battery at the time of charge and discharge at low temperature and at room temperature can be improved. Problems, configurations, and effects other than those described above will be apparent in the following description of embodiments.

DESCRIPTION OF EMBODIMENTS

Figure 1:
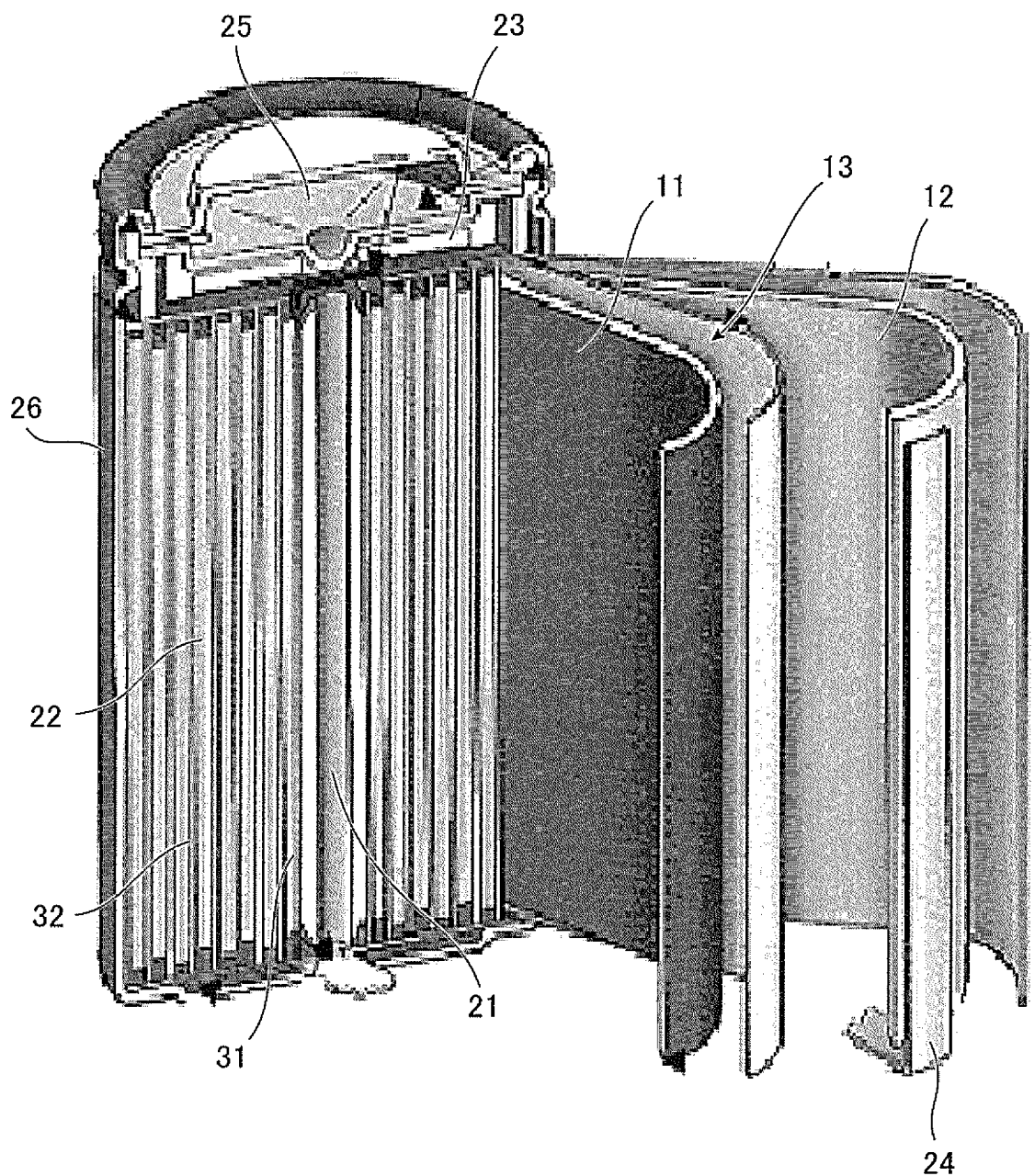
FIG. 1 is a partially cut-out perspective view of a cylindrical non-aqueous secondary battery according to an embodiment of the present invention.

Hereinbelow, embodiments of the present invention will be described with reference to the drawings. The following description shows specific examples of the contents of the present invention. The present invention is not limited to the examples and can be altered and modified in various ways by those skilled in the art within the scope of the technical idea disclosed herein. Also, in the drawings provided to describe the present invention, components having similar functions are shown with the same reference numerals, and description of the duplicate components may be omitted.

FIG. 1 illustrates a lithium ion secondary battery (hereinbelow referred to simply as a battery as well) according to the present embodiment.

In the lithium ion secondary battery illustrated in FIG. 1, a positive electrode plate 11 using composite lithium oxide as an active material and a negative electrode plate 12 using a material holding lithium ions as an active material are wound in a spiral form with a separator 13 interposed therebetween to produce an electrode winding group 22, and the electrode winding group 22 is housed in a bottomed-cylindrical battery can 26. A negative electrode tab 24 led out from a lower portion of the electrode winding group 22 is welded to a bottom portion of the battery can 26, and a positive electrode tab 23 led out from an upper portion of the electrode winding group 22 is welded to a battery cap 25. The battery can 26 is filled with predetermined electrolyte, and the battery cap 25 provided on the circumference thereof with an insulating gasket (not illustrated) is attached to an opening portion of the battery can 26 and is swaged. The lithium ion secondary battery is assembled in this manner. Here, a side of a winding shaft 21 is an inner circumferential side 31, and an outside thereof is an outer circumferential side 32.

Examples of the positive electrode active material applied on the positive electrode plate 11 that can be raised are lithium cobaltate and a modified product thereof (e.g., obtained by dissolving lithium cobaltate with aluminum and magnesium into a solid solution), lithium nickelate and a modified product thereof (e.g., obtained by substituting part of nickel by cobalt), lithium manganate and a modified product thereof, and composite oxide thereof (nickel, cobalt, and manganese). An olivine-type compound or a spinel-type lithium-manganese compound can be used solely, or composite oxide of the above compounds can be used.

An example of a conductive material for the positive electrode that can be used is one or a combination of carbon blacks such as acetylene black, Ketjenblack, channel black, furnace black, lamp black, and thermal black and various kinds of graphite.

Examples of a binder for the positive electrode that can be used are polyvinylidene fluoride (PVdF), a modified product of the polyvinylidene fluoride, polytetrafluoroethylene (PTFE), a rubber particle binder having an acrylate unit. An acrylate monomer, into which reactive functional groups are introduced, or an acrylate oligomer can be mixed into such a binder.

An example of the negative electrode active material applied on the negative electrode plate 12 that can be used is a material into which, a graphite-type material such as various kinds of natural graphite, such as flake graphite and vein graphite, and artificial graphite, is mixed with metal oxide. The metal oxide is not particularly limited as long as the metal oxide is metal that can absorb lithium ions, and examples thereof are nickel oxide (NiO), manganese oxide, cobalt oxide (CoO, $CO_3O_4$), iron oxide (FeO, $Fe_2O_3$), aluminum oxide, tin oxide (SnO), $TiO_2$, $Li_{4/3}Ti_{5/3}OS_4$, $Ce_2O_3$, $V_2O_5$, and CuO. In the present embodiment, iron oxide is used as the metal oxide since iron oxide is large in capacity and low in cost.

An example of a conductive assistant, for the negative electrode that does not dope or dedope lithium ions is one or a combination of carbon blacks such as acetylene black, Ketjenblack, channel black, furnace black, lamp black, and thermal black, various kinds of graphite, carbon nanotube, and carbon nanohorn. A preferable example that can be raised from a viewpoint of electron conductivity is a high structure type in which nano-sized particles are long connected in a continuous manner.

Figure 3:
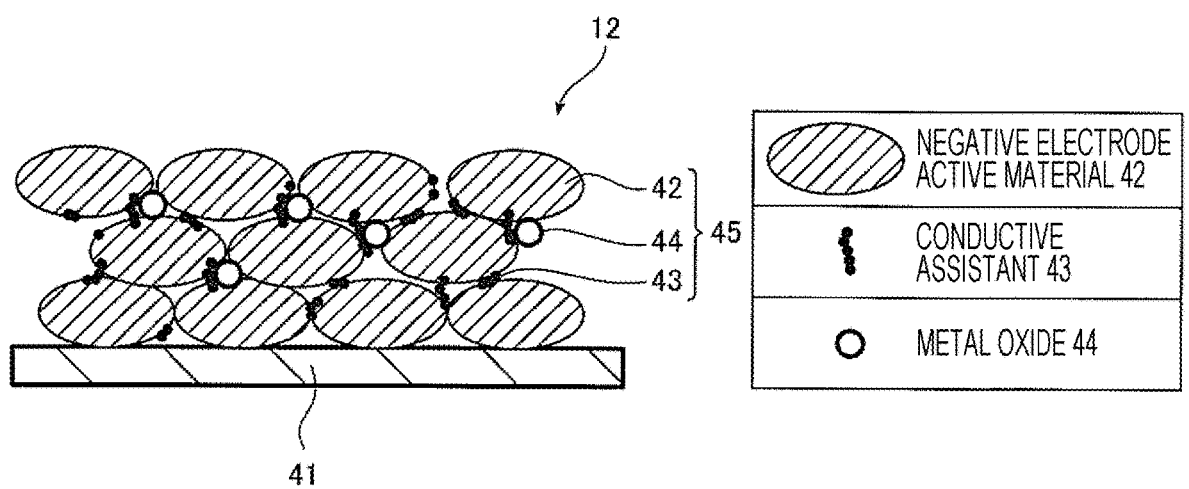
FIG. 3 schematically illustrates a cross-section of a negative electrode plate.

FIG. 3 schematically illustrates a cross-section of the negative electrode plate 12, In the negative electrode plate 12, a negative electrode mix layer 45 containing a graphite-type material 42 serving as the negative electrode active material, a conductive assistant 43, and metal oxide 44 is formed on a surface of a current collector 41.

The particle diameter (d50) of the graphite-type material 42 is larger than the particle diameter (d50) of the metal oxide 44. As for the respective particle diameters of the metal oxide 44, the conductive assistant 43, and the graphite-type material 42, the particle diameter of the metal oxide 44 is the smallest, the particle diameter of the conductive assistant 43 is the second smallest, and the particle diameter of the graphite-type material 42 is the largest. Thus, electrons cannot pass through the metal oxide serving as an electric resistor and can pass through only the conductive assistant 43 and the graphite-type material 42, and a decrease in electric resistance can be prevented.

As a binder for the negative electrode, PVdF, a modified product thereof, and binders of various kinds can be used. From a viewpoint of improvement in acceptability of lithium ions, a styrene-butadiene copolymer (SBR) and a modified product thereof are preferably used with a cellulosic resin such as carboxymethyl cellulose (CMC) or are preferably provided with a small amount of the cellulosic resin.

The separator 13 is not particularly limited as long as the separator has a composition durable in the use range of the lithium ion secondary battery. An olefinic microporous film such as polyethylene and polypropylene in a single-layer or composite form is generally used as the separator and is a preferable mode. The thickness of the separator is not limited and is preferably 10 to 40 μm.

As for the electrolyte, various lithium compounds such as $LiPF_6$ and $LiBF_4$ can be used as an electrolyte salt. Also, as a solvent, ethylene carbonate (EC), dimethyl carbonate (DMC), and diethyl carbonate (DEC) can be used solely or in combination. Also, to form a favorable film on the positive electrode plate and the negative electrode plate to ensure stability at the time of over-charge and over-discharge, vinylene carbonate (VC), cyclohexyl benzene (CHB), and a modified product thereof are preferably used.

The electrode winding group 22 in the present embodiment is not necessarily formed in a true cylindrical shape and may be formed in an elliptic cylindrical shape having an elliptic cross-section of the winding group or in a prismatic shape having a rectangular cross-section of the winding group. A typical and preferable use mode is one in which a bottomed-cylindrical battery can is filled with an electrode winding group and electrolyte and is sealed in a state in which tabs adapted to take out current from electrode plates are welded to a cap and the battery can. However, the present invention is not particularly limited to this mode.

Also, the battery can 26 housing the electrode winding group 22 is not particularly limited and is preferably one excellent in strength, corrosion resistance, and workability such as a battery can made of iron and plated to prevent corrosion and a battery can made of stainless steel. Also, both an aluminum alloy or any of various engineering plastic materials and metal can be used.

EXAMPLES

Hereinbelow, specific examples will be raised to describe the present invention in detail. The present invention can arbitrarily be altered without departing from the scope of the present invention.

Examples P1 to P3

$LiNi_{0.33}CO_{0.33}Mn_{0.33}O_2$ was used as a positive electrode active material to generate slurry. That is, to form a positive electrode mix layer, the positive electrode active material, graphite and acetylene black serving as a conductive assistant, and polyvinylidene fluoride (PVDF) serving as a binder were weighed at a ratio of 89:3:6:3, and N-methyl-2-pyrrolidone (NMP) and an organic solvent were added so that the solid content concentration of the above materials might be 54 weight %. The mixture was mixed in a planetary mixer for 60 minutes to obtain slurry for forming the positive electrode mix layer.

Subsequently, the obtained slurry for forming the positive electrode mix layer was applied to both surfaces of aluminum foil having a thickness of 15 μm serving as a positive electrode current collector so that the application amount might be 13 mg/cm² (in terms of solid content). After the solvent in the paste was dried, the foil was pressed by a roll press machine so that the thickness might be 63 μm to prepare a positive electrode sheet (positive electrode plate) for a lithium ion secondary battery.

Natural graphite coated on a surface thereof with amorphous carbon serving as a negative electrode active material, iron oxide serving as metal oxide, and carbon black serving as a conductive assistant were mixed to have a composition illustrated in Table 1. The mixing ratio is shown in Table 1. Table 1 illustrates examples of test conditions and results according to an embodiment of the present invention.

TABLE 1

| | Mixing Ratio (weight %) | | | | | −30° C. Voltage Drop (V) | 25° C. DC Resistance (mΩ) |
|---|---|---|---|---|---|---|---|
| | Graphite | Iron Oxide | Carbon Black | SBR | CMC | | |
| Example P1 | 94.45 | 3.00 | 0.50 | 1.05 | 1.00 | 0.443 | 119.2 |
| Example P2 | 94.25 | 3.00 | 0.70 | | | 0.420 | 113.3 |
| Example P3 | 93.95 | 3.00 | 1.00 | | | 0.409 | 108.9 |
| Comparative Example C1 | 97.95 | 0.00 | 0.00 | | | 0.507 | 120.7 |
| Comparative Example C2 | 97.95 | 3.00 | 0.00 | | | 0.437 | 130.4 |
| Comparative Example C3 | 93.75 | 3.00 | 1.20 | | | 0.425 | 123.9 |
| Comparative Example C4 | 93.45 | 3.00 | 1.20 | | | 0.430 | 127.9 |

Also, the mixture was mixed with styrene-butadiene rubber (SBR) serving as a binder and carboxymethyl cellulose (CMC) serving as a thickening agent and was mixed with ion-exchange water to generate slurry for forming a negative electrode mix layer.

Subsequently, the slurry for forming the negative electrode mix layer was applied to both surfaces of copper foil having a thickness of 10 μm serving as a negative electrode current collector so that the application amount might be as shown in Table 1. After the moisture in the applied paste was dried, the foil was pressed by a roll press machine so that the thickness might be 67 μm to prepare a negative electrode sheet (negative electrode plate) for the lithium ion secondary battery.

Tabs for collecting current of the positive electrode sheet, and the negative electrode sheet were subject to resistance welding, a porous separator was interposed between the sheets, and the sheets were wound to prepare a winding body having a thickness of 1.5 cm. The winding body was inserted into a 18650 battery can, and the battery can was filled with electrolyte in which supporting salt $LiPF_6$ was dissolved at a concentration of 1 mol/L in a solvent obtained by mixing ethylene carbonate (EC), dimethyl carbonate (DMC), and ethyl methyl carbonate (EMC) at a volume ratio of 2:4:4. The tabs for collecting current of the positive electrode sheet and the negative electrode sheet were connected to respective terminals connected to out sides, and a can cap was closed and sealed, to prepare the lithium ion secondary battery. The battery was charged with constant current, and constant voltage of 0.3 A and 4.1 V to prepare a test lithium ion secondary battery.

Output characteristics of the above lithium ion secondary battery under low-temperature conditions and under room-temperature conditions were evaluated.

As the low-temperature evaluation conditions, after the battery was put in a constant-temperature bath in which the temperature was 25° C., and in which the SOC (State Of Charge) was 35%, the setting temperature was changed to −30° C. After three hours passed, the battery was arbitrarily discharged at constant power. Voltage after a lapse of 2.5 seconds from the start, was measured, and the amount of voltage drop after a lapse of 2.5 seconds from voltage directly after the start of the test was measured, to evaluate overvoltage.

As the room-temperature evaluation conditions, after the battery was put in a constant-temperature bath in which the temperature was 25° C., and in which the SOC was 100%, the battery was arbitrarily discharged at constant, power. Voltage after a lapse of 10 seconds from the start was measured, and an I-V characteristics graph was prepared. From this I-V characteristics graph, DC resistance was calculated. The evaluation results are shown in Table 1 and FIG. 2.

In Examples P1 to P3, at the time of preparing slurry for forming a negative electrode mix layer, the amount of the iron oxide is 3 weight %, and the mixing ratio of the natural graphite to the carbon black serving as the conductive assistant differs from each other as illustrated in Table 1. The other conditions are similar to those described above.

Also, in Comparative Example C1, at the time of preparing slurry for forming a negative electrode mix layer, the iron oxide and the carbon black were not mixed, a negative electrode sheet obtained by mixing the natural graphite, the SBR, and the CMC as in Table 1 was used, and the other conditions were set to be similar to those described above, to prepare a lithium ion secondary battery. Evaluation results of the lithium ion secondary battery are shown.

Also, in Comparative Example C2, at the time of preparing slurry for forming a negative electrode mix layer, the carbon black was not mixed, a negative electrode sheet obtained by mixing the natural graphite, the iron oxide, the SBR, and the CMC as in Table 1 was used, and the other conditions were set to be similar to those described above, to prepare a lithium ion secondary battery. Evaluation results of the lithium ion secondary battery are shown.

In Comparative Examples C3 and C4, at the time of preparing slurry for forming a negative electrode mix layer, the amount of the iron oxide is 3 weight %, and the mixing ratio of the natural graphite to the carbon black serving as the conductive assistant differs from each other as illustrated in Table 1. The other conditions are similar to those described above.

As is apparent from Table 1, in Examples P1 to P3 and Comparative Examples C2 to C4, since the iron oxide is mixed in the negative electrode mix layer, voltage drop at −30° C. decreases further than that in Comparative Example C1, and overvoltage is restricted. However, in Comparative Example C2, since the carbon black is not mixed, and the iron oxide is mixed, DC resistance at 25° C. increases further than that in Comparative Example C1.

Figure 2:
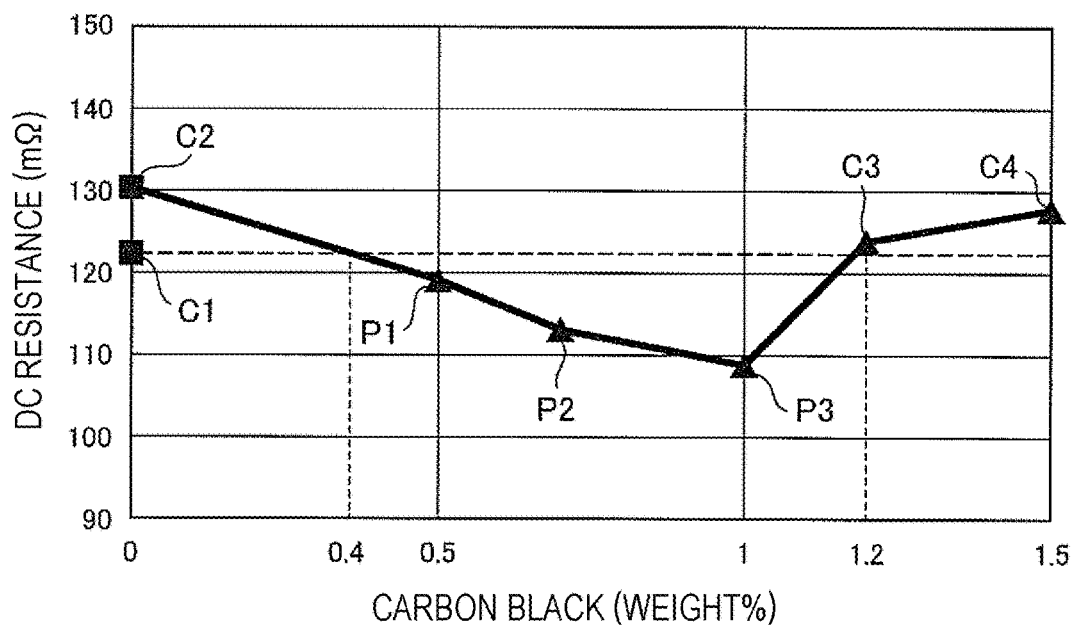
FIG. 2 is a graph illustrating an example of a test result according to an embodiment of the present invention.

As is apparent from FIG. 2, to make the DC resistance lower than that in Comparative Example C1, as illustrated in Examples P1 to P3, the mixing ratio of the carbon black needs to be 0.4 weight % or more and less than 1.2 weight % of the weight of the negative electrode mix layer. When the mixing ratio of the carbon black exceeds 1.0 weight %, aggregation of the carbon black starts. When the mixing ratio is 1.2 weight % or more, the DC resistance is the value in Comparative Example C1 or more again. Accordingly, the mixing ratio of the carbon black is preferably 0.4 weight % or more and 1.0 weight % or less of the weight of the negative electrode mix layer.

Figure 4:
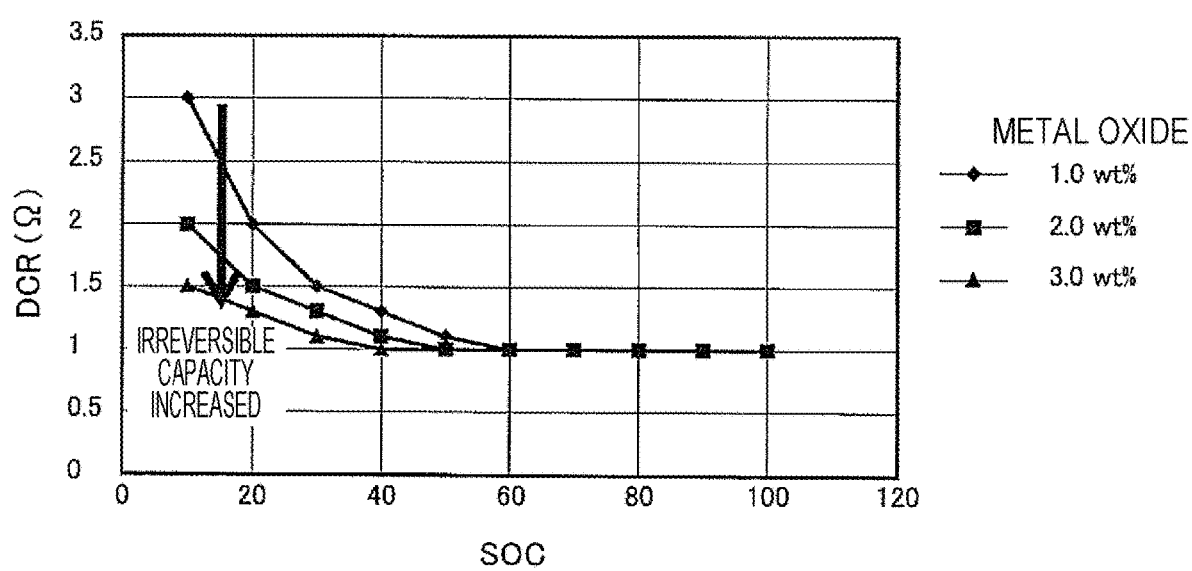
FIG. 4 is a graph illustrating a result of measuring DCR changes against SOC.

The amount of metal oxide is preferably 0.1 weight % or more and 3.0 weight % or less of the weight of the negative electrode mix layer. In a normal lithium ion secondary battery, when the efficiency at the time of initial charge and discharge (initial discharge capacity/initial charge capacity) is low, the battery capacity usable as a battery decreases. It has been found that, in a battery having low initial charge and discharge efficiency, in a case in which changes in DCR against the SOC (State of Charge) especially at as low temperature as −30° C. are measured, the resistance in a low-SOC region tends to decrease (refer to FIG. 4).

A metal oxide kind has higher potential for a charge/discharge reaction (approximately 1.5 to 3.0 (V, vs. $Li/Li^+$)) than graphite (approximately 0.1 to 0.3 (V, vs. $Li/Li^+$)).

Thus, in a case in which the metal oxide and the lithium ions react (conversion reaction) at the time of initial charge, and in which the battery is used at the charge/discharge potential of the graphite, the battery is not used to reach potential that causes the metal oxide to be discharged at the time of discharge. Accordingly, the irreversible capacity can apparently be increased.

Accordingly, by mixing a small amount of metal oxide, the DCR on the low-SOC side can be decreased based on the above mechanism. However, since the too large amount of metal oxide will decrease the battery capacity, the optimal range is 0.1 to 3.0 weight %.

As is apparent from the above description, the lithium ion secondary battery according to the present invention is a lithium ion secondary battery including a positive electrode plate having a positive electrode mix layer and a negative electrode plate having a negative electrode mix layer. The negative electrode mix layer contains a graphite-type material, metal oxide, and a conductive assistant. The conductive assistant is a carbon material that does not dope or dedope lithium ions, and the mixing ratio of the conductive assistant is 0.4 weight % or more and less than 1.2 weight % of the weight of the negative electrode mix layer. With this configuration, it is possible to restrict overvoltage at low temperature and improve output characteristics at room temperature.

Although the present invention has been described with reference to Examples P1 to P3, the present invention is not limited to the above embodiments and can arbitrarily be altered without departing from the scope of the present invention. For example, although the battery is the winding-type lithium ion secondary battery, the present invention can be applied to a laminated lithium ion secondary battery in which a plurality of positive electrode plates and a plurality of negative electrode plates are alternately laminated with separators therebetween.

REFERENCE SIGNS LIST

11 . . . positive electrode plate
12 . . . negative electrode plate
13 . . . separator
14 . . . current collector
21 . . . winding shaft
22 . . . electrode winding group
23 . . . positive electrode tab
24 . . . negative electrode tab
25 . . . battery cap
26 . . . battery can
31 . . . inner circumferential side
32 . . . outer circumferential side

The invention claimed is:

1. A lithium ion secondary battery comprising:
a positive electrode plate comprising a positive electrode mix layer; and
a negative electrode plate comprising a negative electrode mix layer,
wherein the negative electrode mix layer comprises a graphite material, metal oxide, and a conductive assistant,
wherein the conductive assistant in the negative electrode mix layer is a carbon material that does not dope or dedope lithium ions, and a mixing ratio of the conductive assistant in the negative electrode mix layer is (i) 0.4 weight % or more and (ii) less than 1.0 weight % of weight of the negative electrode mix layer,
wherein a particle diameter of the graphite material is larger than a particle diameter of the conductive assistant and a particle diameter of the conductive assistant is larger than a particle diameter of the metal oxide, and
the metal oxide serves as an electric resistor and has a particle diameter insufficient for electrons to pass through the metal oxide.

2. The lithium ion secondary battery according to claim 1, wherein the metal oxide is iron oxide.

3. The lithium ion secondary battery according to claim 1, wherein the amount of the metal oxide is 0.1 weight % or more and 3.0 weight % or less of the weight of the negative electrode mix layer.

4. The lithium ion secondary battery according to claim 1, wherein the conductive assistant is carbon black.

5. A lithium ion secondary battery comprising:
a first electrode plate comprising a positive electrode mix layer; and
a second electrode plate comprising a negative electrode mix layer,
wherein the negative electrode mix layer comprises a graphite material, metal oxide, and a conductive assistant,
wherein the conductive assistant in the negative electrode mix layer is a carbon material that does not dope or dedope lithium ions,
wherein a particle diameter of the graphite material is larger than a particle diameter of the conductive assistant, and a particle diameter of the conductive assistant is larger than a particle diameter of the metal oxide, and
wherein the metal oxide serves as an electric resistor and has a particle diameter insufficient for electrons to pass through the metal oxide and the amount of the metal oxide is 0.1 weight % or more and 3.0 weight % or less of the weight of the negative electrode mix layer.

6. The lithium ion secondary battery according to claim 5, wherein a mixing ratio of the conductive assistant is 0.4 weight % or more and 1.0 weight % or less of the weight of the negative electrode mix layer.

7. The lithium ion secondary battery according to claim 5, wherein the metal oxide is iron oxide.

8. The lithium ion secondary battery according to claim 5, wherein the conductive assistant is carbon black.

* * * * *